United States Patent [19]

Adams et al.

[11] 3,710,037

[45] Jan. 9, 1973

[54] REMOVABLE MAGNETIC HEAD ASSEMBLY WITH LIFTER FINGERS

[75] Inventors: George Adams; John Hawkins, both of New York, N.Y.

[73] Assignee: United Research Laboratory, New York, N.Y.

[22] Filed: Feb. 4, 1971

[21] Appl. No.: 112,626

[52] U.S. Cl. ..179/100.2 R, 179/100.2 CA, 226/199, 274/4 R

[51] Int. Cl. ............................G11b 5/50, G11b 5/56 2

[58] Field of Search.............179/100.2 R, 100.2 C, 100. CA; 274/4 R, 4 A, 11 A, 11 D; 226/199

[56] References Cited

UNITED STATES PATENTS

| | | | |
|---|---|---|---|
| 3,155,359 | 11/1964 | Hogan | 274/4 A |
| 3,042,753 | 7/1962 | Iwamjra | 226/199 |
| 3,602,517 | 8/1971 | Sehnal | 179/100.2 CA |
| 3,552,751 | 1/1971 | Kelso | 179/100.2 CA |

*Primary Examiner*—Bernard Konick
*Assistant Examiner*—Jay P. Lucas
*Attorney*—Posnack, Roberts & Cohen

[57] ABSTRACT

A tape deck is provided with a detachable magnetic head assembly including a group of tape lifter fingers mounted on the assembly and detachable from the deck with the assembly. The fingers are pivotable on a pivot and one of the fingers has a fork extending therefrom which is engaged by the pin of a rotary solenoid which supplies the force by which the fingers are pivoted. The fingers are mounted between magnetic heads and serve to lift magnetic tape from these heads.

9 Claims, 3 Drawing Figures

INVENTORS
GEORGE ADAMS
JOHN HAWKINS

BY Posnack, Roberts & Cohen
ATTORNEYS

INVENTORS
GEORGE ADAMS
JOHN HAWKINS

Posnack, Roberts & Cohen
ATTORNEYS

REMOVABLE MAGNETIC HEAD ASSEMBLY WITH LIFTER FINGERS

BACKGROUND

1. Field of Invention

This invention relates to magnetic head assemblies for tape decks and to lifter devices for removing magnetic tape from magnetic heads under controlled circumstances.

2. Prior Art

It is known that magnetic signals can be recorded on tapes and subsequently reproduced. In fact, this technique has become very sophisticated and involves the use of record heads, reproduce heads and erase heads. Further, techniques have been developed involving the use of different speeds and the possibility of lifting magnetic tapes from the associated heads selectively and under special circumstances for purposes of minimizing head wear as well as tape wear and damage. It is also known that tapes may come in different widths.

The electronic circuits used in conjunction with magnetic heads are very complicated and costly. Therefore, to accommodate different tape widths, head assemblies for the different widths are frequently made in detachable and exchangeable form. Thus, for example, a head assembly suitable for a tape of a 2-inch width may be replaceable by one suitable for an inch-and-a-half width. This has heretofore also required the exchanging of the lifter fingers which is an operation involving much loss of time and labor.

Some specific lifter arrangements are seen in U.S. Pat. Nos. 2,560,254 and 3,037,088.

SUMMARY OF INVENTION

It is an object of the invention to provide an improved detachable magnetic head assembly for tape decks and including lifter fingers detachable therewith, the fingers being suitable for the tape width accommodated by the heads of the assembly thereby avoiding the need for making special finger adjustments when head assemblies are exchanged.

It is another object of the invention to provide an improved tape lifter mechanism which is readily controlled and which is especially suitable for extended operation without failure.

To achieve the above and other of the objects of the invention, there is proposed a detachable head assembly for a tape deck, said assembly comprising a support with at least one magnetic head on the support, the head being traversed by a tape moving along a tape path, there being furthermore provided on the support lifter means to traverse said path and remove the tape from the head, the lifter means and said head being detachable with the support as a unit from the tape deck. An attachment means is provided on the support for physically and electrically connecting the assembly to the tape deck.

More particularly, the lifter means includes at least one finger mounted on a pivot and having connected thereto a fork which is operated by a rotary solenoid whereby the finger is pivoted through a plane at least substantially perpendicular to the path of the tape.

Other objects and features of the invention, as well as advantages thereof, will be apparent from the detailed description of a preferred embodiment which follows hereinafter with reference to the accompanying drawing.

DETAILED DESCRIPTION

Figures 1, 3:
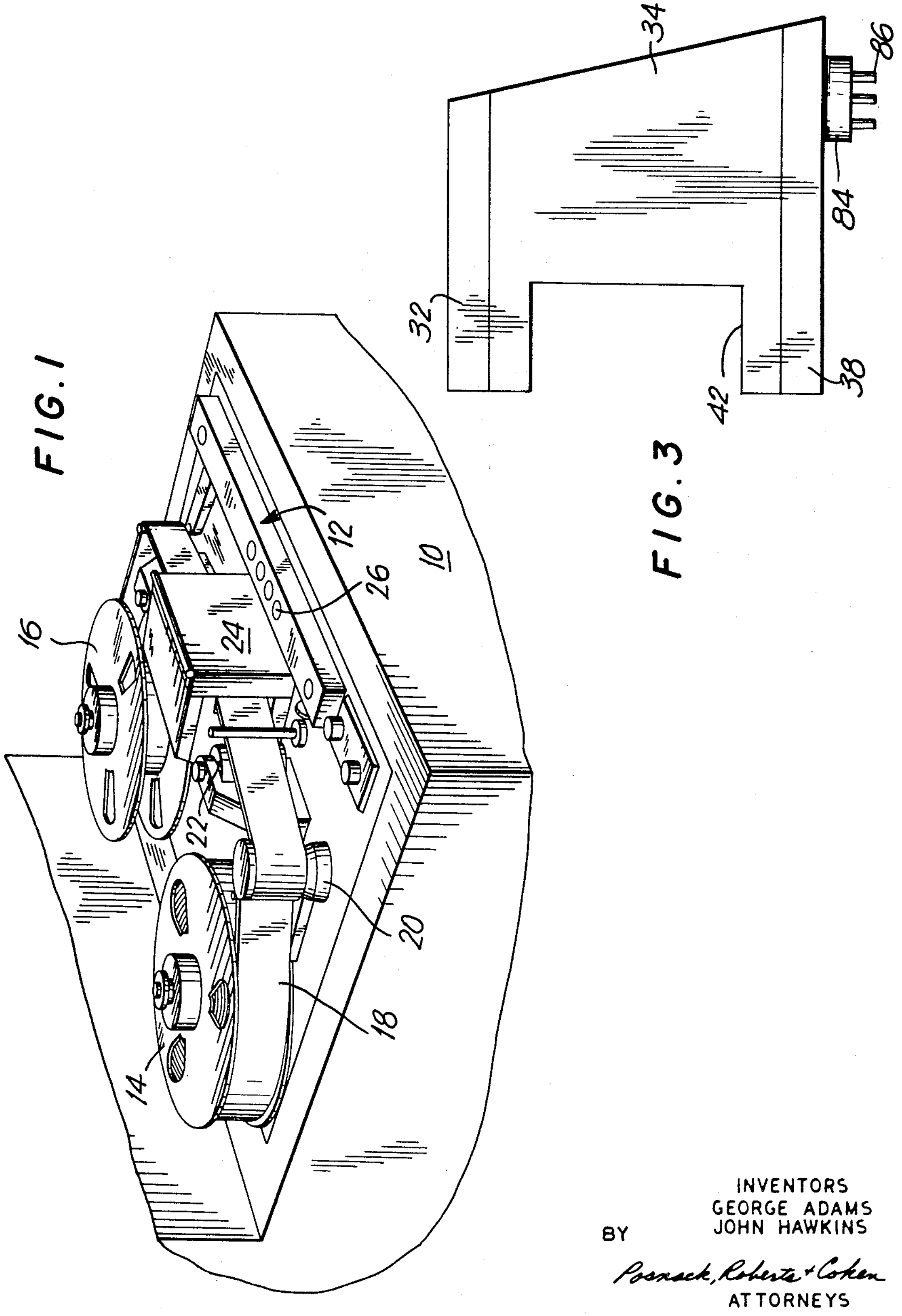
FIG. 1 is a perspective view of a tape deck embodying a magnetic head assembly with lifter fingers provided in accordance with the invention.
FIG. 3 is an end view of the head assembly of FIG. 2.

The apparatus of FIG. 1 includes a console 10 atop which is mounted a tape deck 12 having thereon supply and take-up reels 14 and 16 between which passes a conventional magnetic tape 18 upon which magnetic signals can be recorded to represent music, data and other such information. Within console 10 is accommodated the electronic circuitry incidental to recording, reproducing and erasing operations, all of which is well known and not a part of the present invention.

The magnetic tape 18 follows a sinuous path under the guidance of, for example, rollers 20, 22 and so forth. The tape passes through a magnetic head assembly 24 within which the recording, reproducing and erasing operations take place. At the front of the tape deck appears a plurality of control buttons 26. These control forward and reverse winding of the tape, as well as record, reproduce and so forth.

In processing the tape there are some operations which do not require that the tape be in contact with the magnetic transducer heads and in some of which operations the speed of the tape is greatly increased in order to reduce the time consumed by the operation to a minimum. In such operations, it is advantageous to lift the tape from the magnetic heads to reduce wear of such heads and also to minimize damage to the tape and wear thereof. For this purpose lifter fingers are provided which are electromechanically actuated and which function to lift the tape from the heads selectively and independently.

While only one magnetic tape 18 is shown, the apparatus of FIG. 1 is adapted to operate sequentially on a multitude of tapes with such operation being permitted since the reels 14 and 16 are detachable and replaceable. Sometimes the width of the tapes are different and this is accommodated by a change of the magnetic head assembly which is replaced by another assembly having magnetic heads of suitable width related to that of the magnetic tape to be processed.

Figure 2:
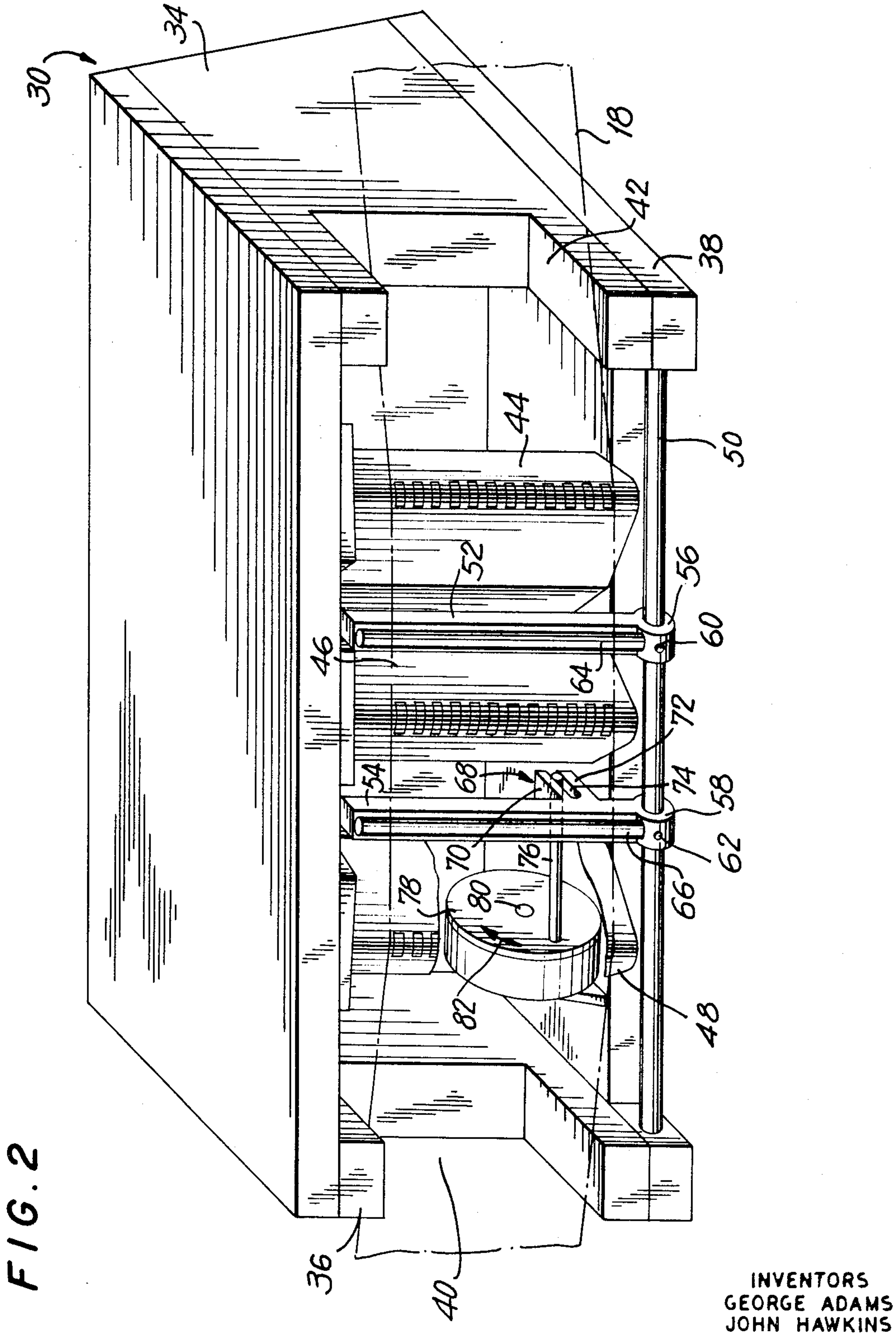
FIG. 2 is a perspective view of the magnetic head assembly of FIG. 1 with the front cover removed.

Heretofore, it has been necessary to provide lifter fingers suitable to accommodate all widths of magnetic tapes or to make these lifter fingers replaceable so that changes could be made in the lifter fingers, as well as in the head assemblies, to accommodate different widths of magnetic tapes. The invention avoids this complication by the provision of a magnetic head assembly with which the lifter fingers are connected to form a unit detachable as a whole. The invention also provides an improved lifter finger arrangement as can be seen by reference to FIGS. 2 and 3.

The lifter head assembly of the invention comprises a support 30, including a top section 32, two side sections 34 and 36 and a bottom 38. Sides 34 and 36 are provided with openings 40 and 42 through which the magnetic tape is adapted to pass.

Mounted between top 32 and bottom 38 are magnetic heads 44, 46 and 48, these being reproduce, record and erase heads respectively. These heads are of conventional construction and serve as transducers to convert electrical signals to magnetic signals and vice-versa. The details of these heads are not a part of the present invention and it is sufficient to understand merely that heads of different heights may be provided to accommodate tapes of different respective widths.

The front of the assembly is recessed and accommodates within such recess a rotatable pivot 50 to which are locked and on which are supported fingers 52 and 54 which are interposed between respective of the aforenoted heads. For this purpose the fingers are provided with wheel-like bottom extremities 56 and 58 mounted on pivot 50 and provided with set screws 60 and 62.

It should be noted that each of the fingers on its front surface is provided with a cylindrical portion 64 or 66 intended to engage and support a surface of the tape. It will also be noted that finger 54 is provided with a fork 68 including limbs 70 and 72 straddling a slot 74.

Accommodated within this slot is a pin 76 mounted on a rotary solenoid 78 of a commercially available type. The axis of rotation of solenoid 78 is indicated at 80 and it will be seen that pin 76 is offset from said axis to be revolvable thereabout in either of two circular directions as indicated by double-headed arrow 82. It will be noted that the axes of solenoid 78 and of pivot 50 are parallel and that they run generally in parallel with the path of tape 18, at least insofar as that portion of said path running along the aforesaid magnetic heads.

Fingers 52 and 54 are pivotable in planes which are at least substantially perpendicular to the path of tape 18. When the fingers 52 and 54 are withdrawn between the heads 44, 46 and 48, the tape 18 is free to engage directly against the heads for electromagnetic transducing operations. When solenoid 78 is operated to bring fingers 52 and 54 forward, the fingers lift the tape from the heads and thus terminate physical contact therebetween. Preferably the front planes of fingers 52 and 54 and cylindrical portions 64 and 66 thereon are parallel to the tape plane or approximately parallel thereto within the region of contact between the fingers and the tape. It will be obvious that since the fingers are pivoted slightly angularly, displacement of the fingers relative to the tape will have to be accommodated by a canting displacement of the tape. This, however, is readily kept within tolerable limits.

In FIG. 3 appears plug 84 with electrical pins 86 thereon. The purpose of this plug and the pins thereon is to provide for physical connection of the head assembly to the tape deck as well as electrical connection with the magnetic heads and with the solenoid 78 to permit control thereof. Such control may be tied in with the mode of operation selected for the tape or may be independent thereof so that there is, for example, a switch controlling withdrawal or extension of the aforenoted lifter fingers.

From what has been stated above, it will be seen that a head assembly is provided which is detachable as a whole from a tape deck and which includes lifter means to traverse the path of the tape being processed to remove or lift the tape from the head or heads in the head assembly unit. The heads are in spaced relationship with one another and cooperatively define at least a portion of the path of the tape, the lifter fingers being interposed between the heads and pivot in planes at least substantially perpendicular to the tape path.

What is claimed is:

1. A detachable head assembly for a tape deck, said assembly comprising a support, at least one magnetic head on said support, said head being traversable by a tape moving along a tape path, lifter means on said support to traverse said path and remove the tape from said head, said means and head being detachable with said support as a unit from the tape deck, and plug means on the support for physically and electrically connecting the assembly to said tape deck.

2. An assembly as claimed in claim 1 wherein said lifter means includes at least one lifter finger with a cylindrical surface thereon.

3. An assembly as claimed in claim 1 wherein said support is provided with openings through which the tape is adapted to pass.

4. An assembly as claimed in claim 1, wherein said lifter means includes a finger for traversing said path to lift the tape from said head and a solenoid for operating said finger.

5. An assembly as claimed in claim 4, wherein said lifter means includes a pivot supporting said finger for pivotable movement through said path.

6. An assembly as claimed in claim 5, wherein said solenoid is a rotary solenoid and includes a pin offset from the axis of the solenoid and extending axially from the solenoid, said lifter means including a fork extending from said finger straddling said pin which operates through said fork to displace said finger.

7. An assembly as claimed in claim 1 comprising a plurality of magnetic heads including the first said head, said heads being in spaced relation and cooperatively defining a portion of said path, said lifter means including fingers interposed between said heads and a pivot supporting said fingers for pivotable movement in planes at least substantially perpendicular to said path.

8. An assembly as claimed in claim 7 wherein said lifter means includes electromechanical means for pivoting one of said fingers which in turn is effective through said pivot to pivot the other of said fingers.

9. An assembly as claimed in claim 8 wherein said heads are respectively record, reproduce and erase heads.

* * * * *